(12) United States Patent
Ghisio et al.

(10) Patent No.: US 8,692,687 B2
(45) Date of Patent: Apr. 8, 2014

(54) PARKING-ASSISTANT SYSTEM

(75) Inventors: Guido Ghisio, Turin (IT); Daniele Marenco, Mondovi (IT)

(73) Assignee: Magneti Marelli S.p.A., Corbetta (Milan) (IT)

( * ) Notice: Subject to any disclaimer, the term of this patent is extended or adjusted under 35 U.S.C. 154(b) by 249 days.

(21) Appl. No.: 12/850,270

(22) Filed: Aug. 4, 2010

(65) Prior Publication Data

US 2011/0156928 A1    Jun. 30, 2011

(30) Foreign Application Priority Data

Dec. 30, 2009  (EP) .................................... 09425546

(51) Int. Cl.
| | | |
|---|---|---|
| *G08G 1/14* | (2006.01) | |
| *B60Q 1/00* | (2006.01) | |
| *A01B 69/00* | (2006.01) | |
| *G01C 22/00* | (2006.01) | |
| *G06F 19/00* | (2011.01) | |

(52) U.S. Cl.
USPC .......... 340/932.2; 340/436; 340/437; 701/41; 701/25; 701/29

(58) Field of Classification Search
USPC .............. 340/932.2, 436, 437; 701/41, 25, 29
See application file for complete search history.

(56) References Cited

U.S. PATENT DOCUMENTS

| | | | | |
|---|---|---|---|---|
| 6,367,407 | B1* | 4/2002 | DiGian, Jr. ...................... | 116/31 |
| 6,426,708 | B1* | 7/2002 | Trajkovic et al. .......... | 340/932.2 |
| 6,564,123 | B2* | 5/2003 | Hahn et al. ........................ | 701/1 |
| 6,683,539 | B2* | 1/2004 | Trajkovic et al. .......... | 340/932.2 |
| 2008/0077294 | A1* | 3/2008 | Danz et al. ...................... | 701/41 |
| 2009/0243888 | A1* | 10/2009 | Kawabata et al. .......... | 340/932.2 |
| 2009/0259365 | A1* | 10/2009 | Rohlfs et al. .................... | 701/41 |
| 2009/0260907 | A1 | 10/2009 | Moshchuk et al. | |
| 2010/0228426 | A1* | 9/2010 | Suzuki et al. ................... | 701/29 |
| 2010/0253593 | A1* | 10/2010 | Seder et al. ........................ | 345/7 |
| 2011/0082613 | A1* | 4/2011 | Oetiker et al. .................. | 701/25 |

FOREIGN PATENT DOCUMENTS

DE    10 2007 036 251 A1    2/2009

OTHER PUBLICATIONS

Jun. 1, 2010 European Search Report for EP 09 42 5546.

* cited by examiner

*Primary Examiner* — George Bugg
*Assistant Examiner* — Munear Akki
(74) *Attorney, Agent, or Firm* — Howard & Howard Attorneys PLLC

(57) ABSTRACT

A parking-assistant system for "multi-maneuver parking", which is designed for generating, before the parking maneuver is started, a predetermined path, via the simulation of a maneuver of exit from a parking space. The control effected by the system, during the real parking maneuver, limits itself to comparing the effective position of the vehicle with respect to the predetermined path. Said control has somewhat low computational requirements so that the system is quite reliable.

12 Claims, 7 Drawing Sheets

PARKING-ASSISTANT SYSTEM

BACKGROUND OF THE INVENTION

The present invention is a parking-assistant system for assisting the driver in a manoeuvre in reverse for parking the vehicle at the roadside, parallel to the direction of the road, in a parking space between a first obstacle and a second obstacle that define, respectively, the front limit and the rear limit of said space with respect to the body of the vehicle. In particular, the present invention is a system including a detection mechanism for detecting the scene external to the vehicle, and a processing mechanism designed to generate control signals for following a parking path.

The object of the present invention is to provide a simple and reliable system that will enable parking in the least possible number of manoeuvres.

SUMMARY OF THE INVENTION

In one embodiment, the detection mechanism of the system is designed for generating signals indicating the scene surrounding the parking space while the vehicle proceeds to a start-of-manoeuvre position, and the processing mechanism is designed to generate, when the vehicle has not yet started the parking manoeuvre, a series of signals indicating positions along one and the same reference path for effecting the parking manoeuvre. In particular, the processing mechanism generates the series according to the following logic:
  evaluating, on the basis of the signals coming from the detection mechanism, and with respect to a predefined reference system, the position of the first and second obstacles;
  generating values of impact with the first obstacle and/or second obstacle, and attributing to the vehicle parameters indicating its position with respect to the reference system; and
  varying the parameters in a way corresponding to a simulation, in the reference system, of a manoeuvre of exit from the parking spot starting from a predetermined end-of-parking position.

The signals indicating the reference positions represent the values assumed by the parameters in the simulation, which are different from the impact values.

As emerges from the above, before the parking manoeuvre is started, the system processes a sequence of positions for a reference parking manoeuvre. The sequence of positions is processed by simulating exit of the vehicle from the parking space, in the scenario that is reconstructed on the basis of what is detected by the detection mechanism when the vehicle passes in front of the parking space to reach the start-of-manoeuvre position. In particular, the scenario is reconstructed within a predefined reference system, with respect to which are defined the co-ordinates of the obstacles that delimit the free area of manoeuvre and the parking space. Next, the processing mechanism simulates, within the reference system, exit of the vehicle from the parking space, starting from a predefined end-of-parking position, to bring the vehicle into the start-of-parking position that it actually occupies. The processing mechanism records the co-ordinates of the positions of the vehicle in which impact with the obstacles does not occur. The set of the co-ordinates constitutes the reference path for the manoeuvre to be performed.

During the parking manoeuvre proper, the parking-assistant system generates control signals for following the path.

In other words, the system is able to generate, before the parking manoeuvre is started, a predetermined path for execution of the parking manoeuvre in the lowest possible number of manoeuvres. The control effected by the system, during the real parking manoeuvre, is limited to comparing the effective position of the vehicle with respect to the predetermined path and to generating control signals as a function of the deviation detected between them. The control has somewhat low computational requirements so that the system is quite reliable.

In one embodiment, the predefined end-of-manoeuvre position is identified so that the vehicle is closer to the rear obstacle than to the front one.

Another embodiment envisages that the processing mechanism execute a querying operation, in which:
  the parameters assume initial values, defined with respect to the reference system, that correspond to the end-of-parking position of the vehicle;
  the parameters are then varied starting from the initial values in a way corresponding to the simulation of a first manoeuvre of advance of the vehicle to exit from the parking spot starting from the end-of-parking position;
  it is verified whether in the simulation the parameters assume an impact value;
  if the parameters do not assume any impact value, then they are varied in a way corresponding to the simulation of a second manoeuvre of advance of the vehicle to exit from the parking spot, subsequent to the first simulated manoeuvre;
  if the parameters assume, instead, impact values, there is envisaged simulation of a third manoeuvre of reverse and subsequently simulation of a new first manoeuvre, until in the simulation of the new first manoeuvre the parameters assume only values different from impact values, at that point, the parameters being then varied in a way corresponding to the simulation of the second manoeuvre of advance.

The signals indicating the reference positions that are generated by the processing mechanism represents the values assumed by the parameters in the first, new first, second, and third manoeuvres, which are different from the impact values.

In this embodiment, the system is able to process predetermined paths for so-called "multi-manoeuvre parking". The latter is necessary when the parking space available is of dimensions such as to require a number of steps of steering and countersteering to be able to park the vehicle. For these manoeuvres, which are of considerable complexity, the system limits itself to checking the deviations between the positions assumed by the vehicle and the corresponding predetermined path.

BRIEF DESCRIPTION OF THE DRAWINGS

Further characteristics and advantages of the invention will emerge clearly from the annexed drawings, which are provided purely by way of non-limiting example and in which.

DETAILED DESCRIPTION OF THE INVENTION

Figure 3:
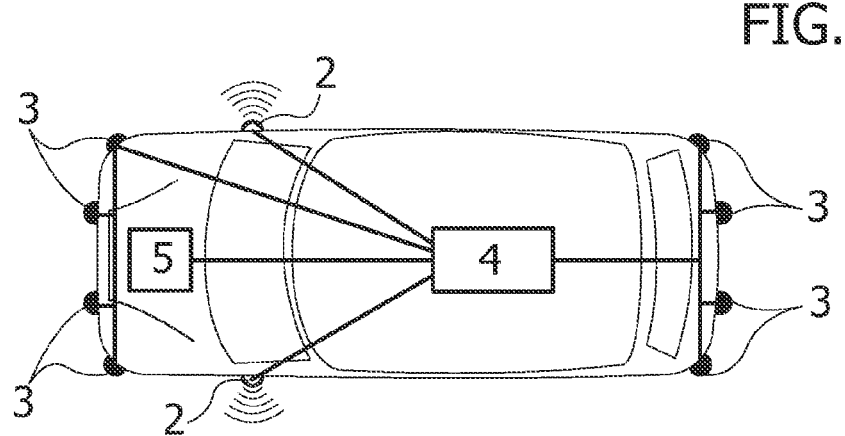
FIG. 3 represents a schematic view of the parking-assistant system provided on a motor vehicle.

FIG. 3 illustrates a motor vehicle provided with a parking-assistant system. The system includes detection mechanism 2 designed to detect the scene external to the motor vehicle. The detection mechanism can include ultrasound sensors designed to detect the distance of surrounding objects from the vehicle. The sensors must be powerful enough to detect the presence of obstacles even when the vehicle passes alongside but not strictly close to them. Alternatively, the detection mechanism can include optical detectors, such as video cameras. In this case, it is necessary to equip the system with a processing unit designed to generate spatial information on the basis of the visual information detected. The system can moreover operate in association with proximity sensors 3, illustrated in FIG. 3, which are conventionally set on the front and rear bumpers.

In the example of FIG. 3, the parking-assistant system has a control unit or processing mechanism 4 and a command unit 5. As will be described more fully in what follows, the unit 4 manages the process of generation of the predetermined path and of control of the deviation between the latter and the actual one of the vehicle, while the unit 5 governs the steering system of the motor vehicle on the basis of the signals that it receives from the unit 4.

The unit 5 can, for example, be operatively connected to an electric motor designed to intervene on the steering system for controlling the steering angle of the front axle of the vehicle.

Figure 4:
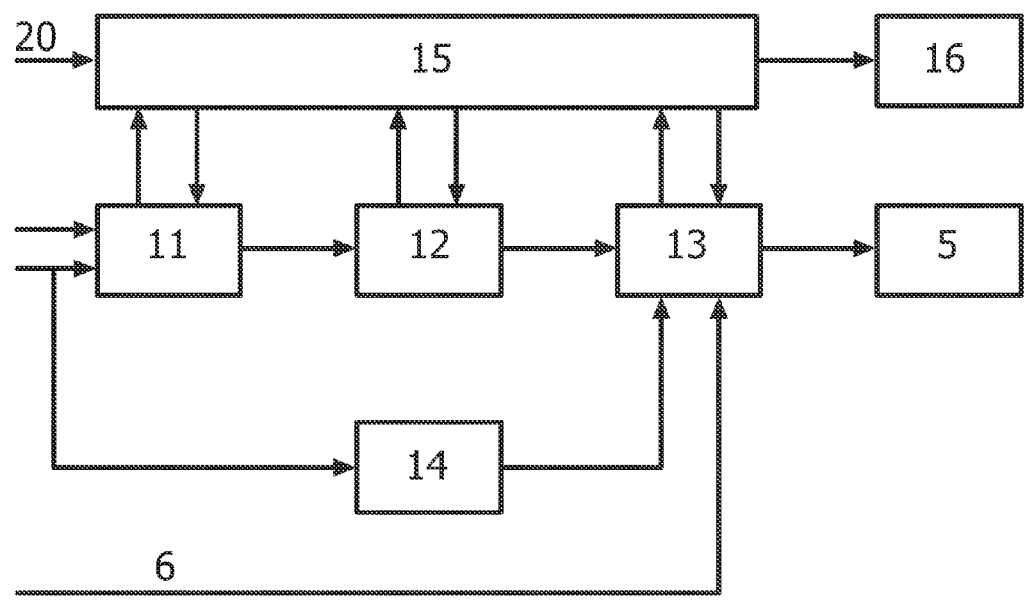
FIG. 4 represents a block diagram of the parking-assistant system.

FIG. 4 illustrates an example of block diagram of the control unit or processing mechanism 4.

The control unit 4 includes a central management block 15, which manages and co-ordinates the operations of blocks 11, 12, 13, 14, 15 and of the user interface 16, which will be described in greater detail below.

The central block 15 is connected to a pushbutton that the driver presses when he wishes to park the vehicle. At that point, activation signals 20 are received by block 15, which activates the entire system.

According to modalities already known, when the system is activated, it is set in a condition of search for a space sufficient for parking the vehicle. Once the parking space has been identified, block 15 signals to the driver, via the interface unit 16 (for example, a display of the on-board control panel or the TFT of the navigation system), that it is possible to carry out the parking manoeuvre in the space identified. The position in which the driver stops the vehicle corresponds to the start-of-manoeuvre position illustrated in FIGS. 1 and 2.

To return to FIG. 4, block 11 is a detection block that is operatively connected to the detection mechanism so as to receive signals 7 generated thereby. The detection block is moreover operatively connected to sensors set on the vehicle, which issue signals 8 indicating the speed, displacement, and steering angle of the vehicle.

In the example described herein, when the system is activated and the driver is looking for a parking space, whenever the vehicle passes in front of a free space, block 11 verifies whether said space is sufficient or not for the vehicle in question.

Figure 1:
FIG. 1 represents a situation of parallel parking along a rectilinear stretch of road.
Figure 2:
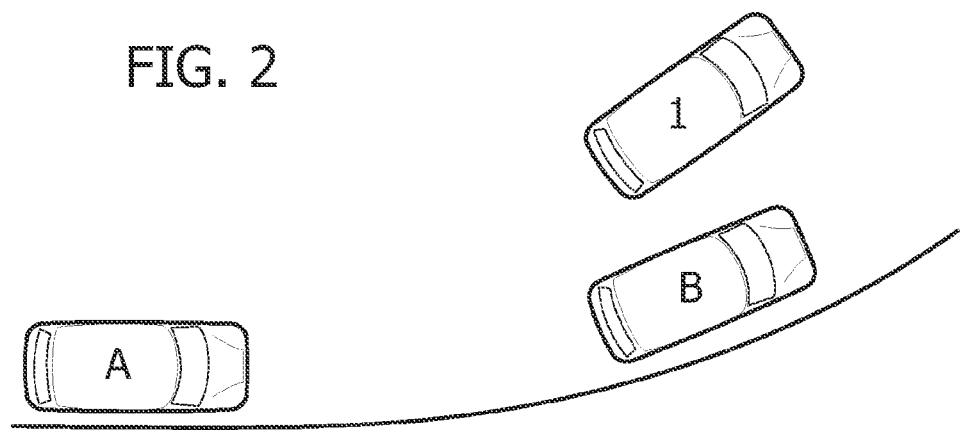
FIG. 2 represents a situation of parallel parking along a curvilinear stretch of road.

Block 11 is moreover designed for reconstructing the scenario of the parking manoeuvre to be performed, once the suitable parking space has been identified and the vehicle is in the start-of-manoeuvre position 1, illustrated in FIGS. 1 and 2. In particular, block 11 identifies, within a predefined reference system, the position of the obstacles that delimit the parking space and the free area of manoeuvre. This is obtained via a process of geometrical reconstruction that derives the co-ordinates of the obstacles in the reference system, combining the information on distance of the obstacles, speed, direction, and displacement of the vehicle, which are determined while the vehicle is advancing and "films", via the detection means, the parking scenario.

To define the parking space available and the free area of manoeuvre, block 11 applies safety margins to the co-ordinates calculated, in such a way as to consider an available space and a free area of manoeuvre smaller than the ones detected.

Operatively connected to block 11 is block 12, which represents a path-generating block. This block has the function of determining the reference path in the reconstructed parking scenario. The parking path, as will be described in greater detail below, is determined when the vehicle is still stationary in the start-of-manoeuvre position.

The path is determined by simulating within the reference system a manoeuvre of exit from the parking space. The exit manoeuvre is simulated, starting from a desired end-of-parking position, for bringing the vehicle up to the start-of-manoeuvre position that it actually occupies. The end-of-parking position is defined on the basis of pre-set distances at which it is desired that the vehicle should be located from the rear obstacle and the off-side edge (i.e., closer to the centre of the road) of the parking space.

In the simulation, parameters are attributed to the vehicle that indicate its position in the pre-set reference system. In the simulation, the parameters assume initial values equal to the co-ordinates of the end-of-parking position indicated above. The parameters hence vary in a way corresponding to the positions that the vehicle assumes during the pre-set manoeuvres of the simulation. In other words, the parameters assume the values of the co-ordinates of the positions occupied by the vehicle during the simulation of the exit manoeuvre.

FIGS. 1 and 2 illustrate two different parallel-parking situations. The unit 11 reconstructs the geometry for detecting the parking scenario of FIGS. 1 and 2, on the basis of the information detected while the vehicle passes in front of the parking space, to arrive at the start-of-manoeuvre position 1'.

FIGS. 1 and 2 differ inasmuch FIG. 1 represents a situation of parallel parking along a rectilinear stretch of road, while FIG. 2 represents a parallel-parking situation in a curvilinear stretch of road. It should be noted that the system described herein is able to assist the driver in both of the situations illustrated.

The modalities with which the predetermined path is generated will be described in what follows with reference to the situation illustrated in FIG. 1. A similar modality is envisaged for the situation illustrated in FIG. 2.

Figure 7A:
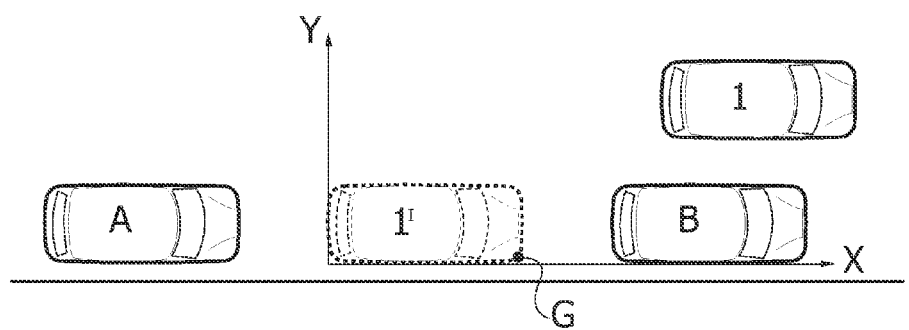
FIGS. 7A-7B are schematic illustrations of processing performed by the system in the situation of FIG. 1.
Figure 7B:
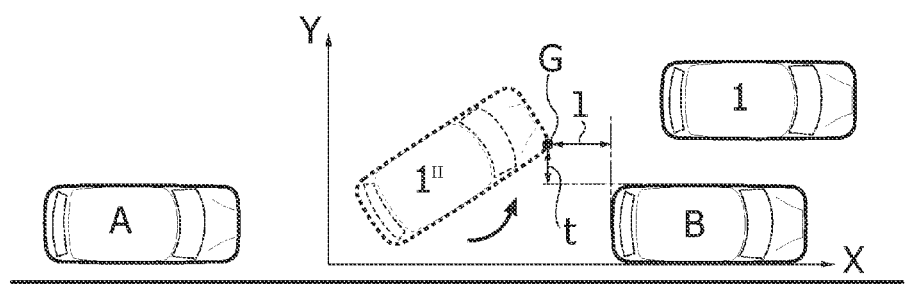

FIG. 7 represent a first example of simulation of an exit manoeuvre for a situation of parallel parking along a rectilinear stretch of road.

Figure 5:
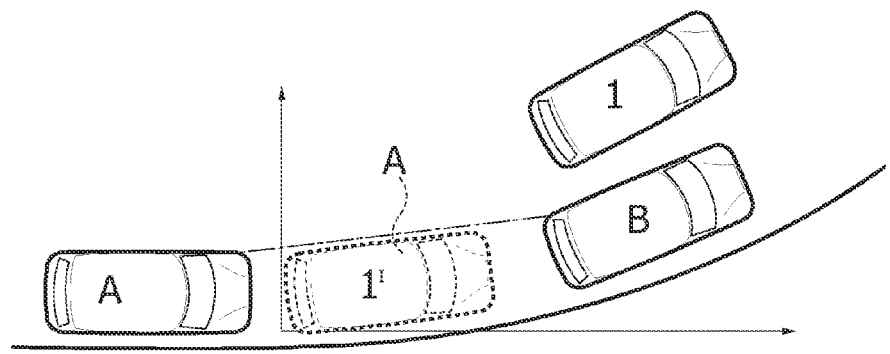
FIG. 5 is a schematic illustration of processing by the system of the situation represented in FIG. 2.

The position 1I illustrated in FIG. 7a represents the end-of-manoeuvre position, which is identified by block 12, from which the simulation of the exit manoeuvre is started. In this connection, it is to be noted that in the situations of parallel parking along curvilinear stretches of road, the initial position 1I is chosen such that the vehicle will come to be parallel to the line A (shown in FIG. 5) joining the two off-side corners (i.e., the corners closer to the centre of the road), facing one another, of the front obstacle and of the rear obstacle, respectively.

During the simulation, block 12 considers a set of significant points of the body of the vehicle, calculating each time for them, during simulation, the co-ordinates within the reference system XY. In one example, starting from the final end-of-parking position 1I up to the start-of-manoeuvre position 1, block 12 calculates the co-ordinates of all the positions that are, with respect to the previous one, at the distance of a same pre-set angular pitch, which is defined by the rotation of one of the front wheels of the vehicle (so-called "wheel tick").

With specific reference to the corner G of the vehicle, highlighted in the figures, its co-ordinates are initially calculated at the position 1I that has been predefined as desired end-of-manoeuvre position. Simulation of the exit manoeuvre hence envisages an advance of the vehicle at a first steering angle until the position 1II of FIG. 7A is reached. As first steering angle, there is preferably chosen the maximum steering angle of the vehicle. The position 1II is chosen on the basis of the desired distances 1, t at which it is imposed that the body of the vehicle should be located from the obstacles A and B. Further distances between the body of the vehicle and the obstacle B can likewise be considered and controlled.

During the advance, the unit 12 each time calculates the new co-ordinates of the corner G, and of all the points considered of the body of the vehicle, and stores the values thereof. The points of the body of the vehicle considered can, for example, be the four outermost corners.

FIG. 6 represent another example of simulation obtained by block 12 for a situation of parallel parking along a rectilinear stretch of road. Also in this case, during simulation block 12 considers a set of significant points of the body of the vehicle, calculating each time for them, during the simulation, the co-ordinates within the reference system XY.

As in the case described previously, the position 1I corresponds to a predetermined end-of-parking position, from which the initial values of the co-ordinates of the points considered of the body of the vehicle are calculated, amongst which are, for example, the points G and H highlighted in the figures.

In this second example, the simulation of the first advance at the first steering angle brings the corner G of the vehicle into impact with the obstacle B.

Block 12 realizes the occurrence of the impact verifying that the co-ordinates of point G during said manoeuvre assume values corresponding to the co-ordinates of the obstacle B in the reference system XY. As mentioned previously, the co-ordinates of the obstacles A and B have been calculated by block 11 during the geometrical reconstruction of the scenario.

Figure 6A:
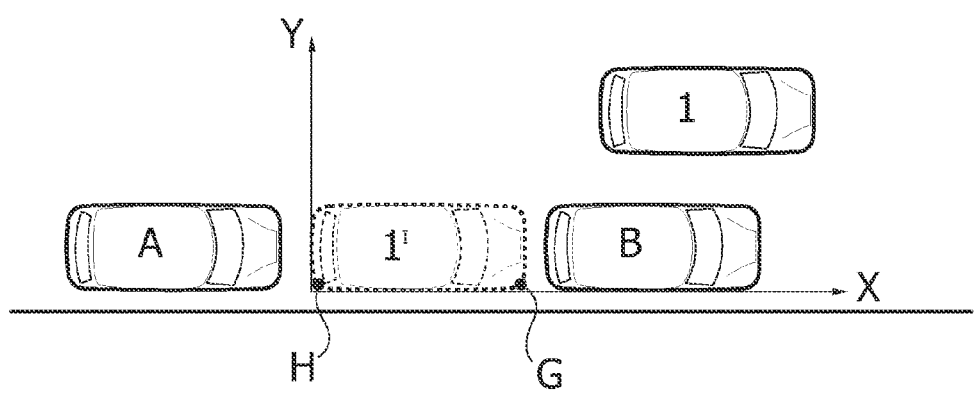
FIGS. 6A-6D are schematic illustrations of processing performed by the system in the situation of FIG. 1.
Figure 6B:
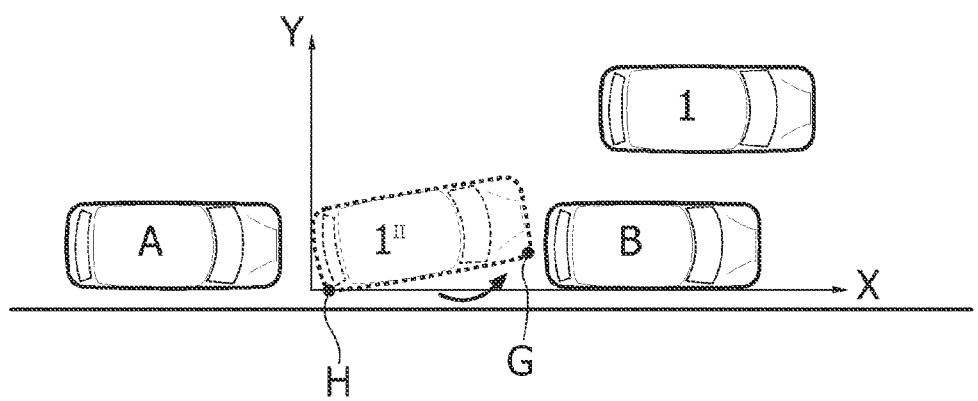

Block 12 then stores the co-ordinates of the points considered of the body of the vehicle, in the positions assumed as far as the position 1II, which is the limit of non-impact, illustrated in FIG. 6b.

Next, the unit 12 envisages simulation of a reverse manoeuvre of the vehicle, starting from the position 1II. The reverse manoeuvre is executed with a second steering angle, of opposite sign with respect to the first steering angle. Preferably, chosen as second steering angle is the maximum steering angle of the vehicle.

Figure 6C:
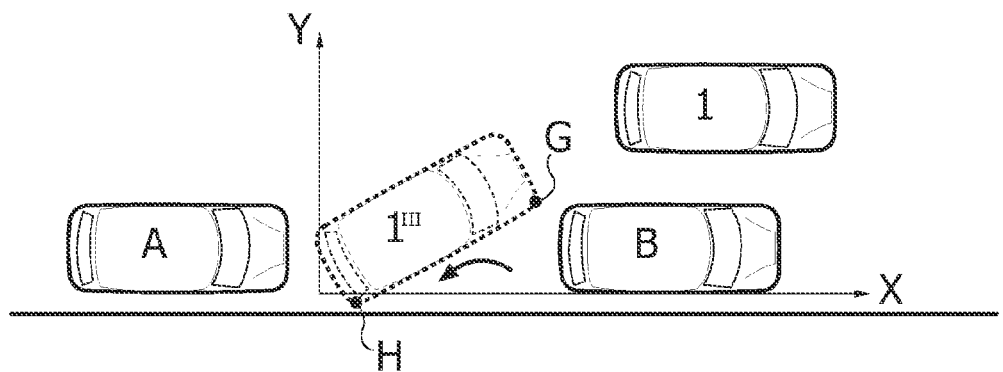

The reverse manoeuvre brings the corner H of the vehicle, highlighted in FIG. 6c, into impact with the wall that delimits the parking space laterally. The unit 12 realizes the existence of the circumstance by verifying that the co-ordinates of the corner H assume the values of the co-ordinates of said side wall. The unit 12 then stores the co-ordinates of the points considered of the body of the vehicle, in the positions assumed (during reverse), up to the non-impact limit position 1III, illustrated in FIG. 6c.

Figure 6D:
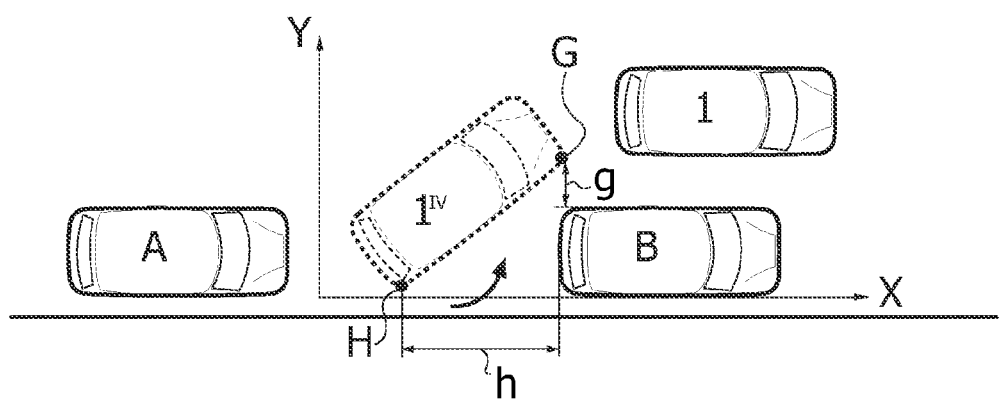

At this point, the unit 12 envisages simulation of a further manoeuvre of advance at the first steering angle, starting from the position 1III indicated above, until it reaches the position 1IV illustrated in FIG. 6d. The control unit 12 verifies that in the simulation of said further manoeuvre of advance there are no situations of impact so that the manoeuvre can terminate in a pre-set position 1IV. In the position 1IV, the corners G and H are, for example, at pre-set distances g and h, at which it is imposed that the vehicle should be with respect to the obstacle B, at the end of the further manoeuvre of advance at the first steering angle.

The unit 12 stores the co-ordinates of the points considered of the body of the vehicle, in the positions that assumed to arrive at the position 1IV.

At the end of the simulations illustrated in FIGS. 7 and 6, starting from the positions 1IV or 1II respectively reached in said simulations, there is envisaged simulation of a further manoeuvre of advance at a third steering angle, of opposite sign with respect to the first angle, which brings the vehicle up to the position 1 of start of manoeuvre.

Figure 8:
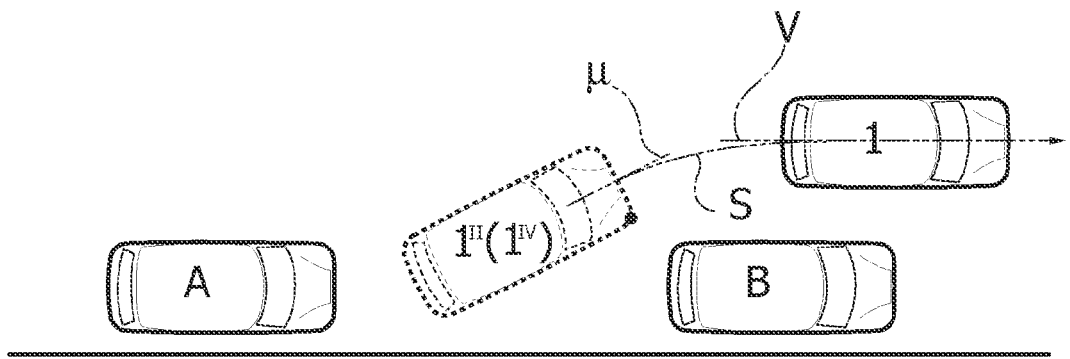
FIG. 8 is a schematic illustration of processing performed by the system in the situation of FIG. 1.

Illustrated in FIG. 8 is the path S of the simulation, which is processed by block 12 imposing that it should be tangential to the directions $\mu$, V of the vehicle, when the latter occupies, respectively, the position 1II or 1IV and the position 1, and verifying that no situation of impact between the vehicle and the obstacle B corresponds thereto. For this purpose, block 12 uses polynomial curves, such as fourth-degree Bezier curves, by choosing points of passage whereby impact of the vehicle with the obstacles that define the free area of passage is avoided. It is imposed, for example, that the co-ordinates of the points considered of the body of the vehicle assume the values of the co-ordinates of the free area of passage. For this step, it is particularly advantageous to consider some points of the near side of the body of the vehicle.

The co-ordinates of the positions assumed by the points considered of the body of the vehicle in the further simulation are stored by the unit 12.

All the co-ordinates that have been stored by block 12 come to determine the series of reference positions for effecting the parking manoeuvre.

Figure 9:
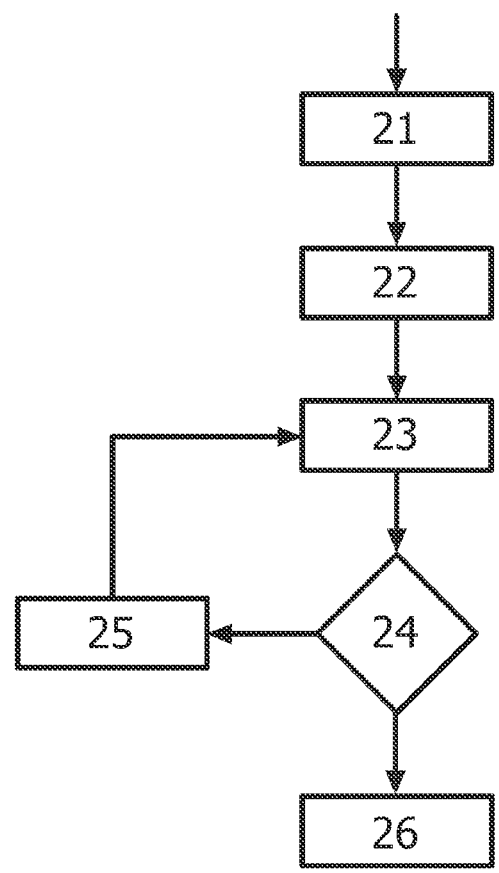
FIG. 9 represents an algorithm executed by the parking-assistant system.

Illustrated in FIG. 9 is the algorithm of the procedure described above. Determined in step 21 is the geometry for detecting the parking scenario in the predefined reference system. In step 22, attributed to the parameters indicating the position of the motor vehicle in the reference system XY are values corresponding to the final parking position. Simulated in step 23 is the first manoeuvre of advance at the first steering angle. In step 24, it is verified whether the parameters indicating the position of the vehicle during this manoeuvre assume values indicating situations of impact with the obstacles.

In the case of presence of situations of impact, the algorithm envisages the step 25, in which a manoeuvre of reverse is simulated at a second steering angle of opposite sign with respect to the first. Next, step 23 is again envisaged, in which simulation of a new manoeuvre of advance at the first steering angle is made.

When, in step 24, it is verified that in the simulation of step 23 there are no situations of impact, there is instead envisaged step 26, in which the manoeuvre of advance at a third steering angle of opposite sign with respect to the first is simulated.

The path generated with reference to FIG. 7 corresponds to a parking manoeuvre in two steps, whereas the path generated with reference to FIG. 6 corresponds to a so-called "multi-manoeuvre parking".

What has been described so far herein is performed by the system before the effective parking manoeuvre is started, when the vehicle is still in the start-of-manoeuvre position 1, represented in FIGS. 1 and 2.

To return to FIG. 4, block 12 is operatively connected to a block 13 for control of the angle of steering of the vehicle. Block 13 is likewise operatively connected to a block 14, which is designed to derive the positions assumed by the vehicle in the reference system XY, during the real parking manoeuvre, on the basis of the signals 8, indicating the real conditions of the vehicle, such as speed, direction, and displacement. Preferably, block 14 considers the positions that are assumed by the points of the body of the vehicle that have been already considered by block 12. Block 14 generates information on the effective position of the vehicle during the parking manoeuvre and transmits it to the control block 13. The position of the vehicle must be evaluated with respect to the same scenario reconstructed previously. Block 14 is hence linked to block 12 in order to be co-ordinated for this scenario, and derive with respect thereto the positions of the vehicle during the manoeuvre. Furthermore, in the example in which the positions considered by block 12 are at distances each with respect to the previous one by a wheel tick, block 14 co-ordinates itself so that it too will consider positions of the vehicle that are at distances each with respect to the previous one by the same wheel tick considered by block 12, starting from the start-of-manoeuvre position 1.

As mentioned previously, during the effective parking manoeuvre, the system just makes a check on the steering system for following the predetermined path.

In the example described here, the control block 13 is designed to generate commands for governing steering of the vehicle. These commands are generated on the basis of the deviation found between the predetermined path by block 12 and the positions determined by block 14.

The control signals generated are then sent to block 5 for driving the actuator so that it governs the steering angle of the vehicle. Alternatively, the control signals can be converted into instructions for the driver to be displayed on a user interface.

The real parking manoeuvre is thus executed under the control of block 13, which verifies the deviations of the real path from the predetermined one, and governs corresponding path adjustments in order to follow a real path that corresponds as much as possible to the predetermined one. Since the predetermined path is known in its entirety, in the case of deviation, block 13 is able to envisage the best path, not only for joining up thereto, but also for limiting possible further deviations. For this purpose, block 13 calculates gradual adjustments, which might be followed properly in the manoeuvre.

It should be noted that block 13 receives signals 6 from the proximity sensors 3 (illustrated in FIG. 3), as further precaution against impacts both with the obstacles A and B and the wall or obstacle that delimits the parking space laterally and with possible obstacles that are interposed in the area of manoeuvre after the vehicle has reached the start-of-manoeuvre position and the parking scenario has already been reconstructed. In the latter case, block 13 issues signals of acoustic or visual warning to the user interface 16.

In one example, the parking-assistant system envisages automatic control of steering of the vehicle, whilst the driver has control over the accelerator, brake, and direction of travel.

Figure 10:
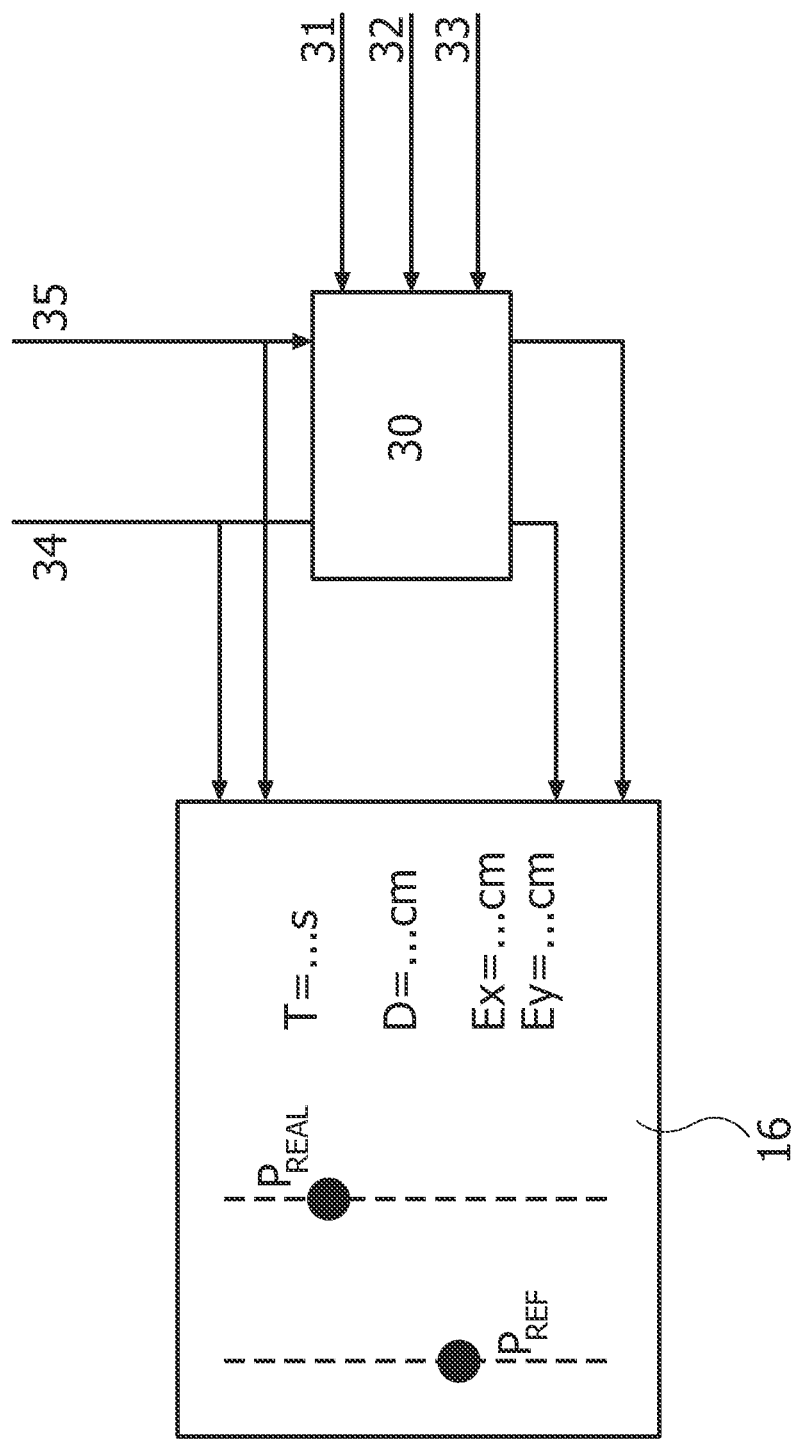
FIG. 10 represents a diagram exemplifying the application of a Kalman filter in a parking-assistant system.

The user interface 16 has the function of indicating to the driver how to effect the control on said elements. In multi-manoeuvre parking, it is particularly important for the intervention of the driver to be sufficiently timely for the real path to deviate as little as possible from the predetermined one. In one embodiment, to facilitate the driver an acoustic emitter is provided, which warns him of the moment at which to intervene. The acoustic signal is emitted with a time of advance that takes into account the reaction times of the driver. For this purpose, the system envisages a Kalman filter of the type illustrated in FIG. 10, where designated by 30 is a prediction block, which receives at input signals 31, 32, 33 indicating, respectively, the speed of the vehicle, the steering angle, and the rate of variation of the steering angle. Block 30 moreover receives signals 34 and 35 indicating the deviation of the real position of the vehicle from the predetermined path, respectively, on the axis X and on the axis Y of the reference system X, Y.

On the basis of these signals, block 30 issues a command emission of a sound signal of an intensity that is inversely proportional to the lapse of time of advance with which the signal has been emitted. Block 30 moreover governs display of references useful for the driver on the type of operation that he will have to perform and on the speed at which he will have to perform it.

Within the Kalman filter the dynamics of the vehicle is modeled in order to predict the future positions of the vehicle (distant in time by some hundreds of milliseconds). In particular, it is estimated where the vehicle will move, associating to the model of the automobile the information of speed, and rate of variation of the steering angle (yaw rate). As a function of the error that occurs between the reference position and the real position of the vehicle (error on the co-ordinate X and error on the co-ordinate Y), the driver is guided, by means of written information, arrows, and acoustic signals, on the path that leads closest to the reference point of the predetermined path.

Of course, without prejudice to the principle of the invention, the details of construction and the embodiments may vary widely with respect to what has been described and illustrated herein, without thereby departing from the scope of the invention, as defined by the ensuing claims, which are to be considered as forming an integral part of the description.

What is claimed is:

1. A parking-assistant system for assisting a driver in a manoeuvre in reverse for parking a vehicle at a roadside parallel to a direction of a road in a parking space between a first obstacle and a second obstacle that define, respectively, a front limit and a rear limit of the parking space with respect to a body of the vehicle, wherein said parking-assistant system is implemented in a computer program and carried-out on a computer system that includes at least one of a computer having a memory, processor, display, and user-input mechanism, said parking-assistant system comprising:
 a detection mechanism for detecting a scene external to the vehicle; and
 a processing mechanism for generating control signals for following a parking path;
 wherein said detection mechanism generates signals indicating the scene surrounding the parking space while the vehicle proceeds to a start-of-manoeuvre position and said processing mechanism generates a series of signals indicating positions along a reference path for the parking manoeuvre, when the vehicle has not yet started the parking manoeuvre and is still situated outside of the parking space, according to logic that follows:

evaluating, on a basis of said signals coming from said detection mechanism and with respect to a predefined reference system, a position of the first and second obstacles;

generating values of impact with either of the first and second obstacles and, attributing to the vehicle parameters, indicating the position of the vehicle with respect to said reference system; and varying said parameters in a way corresponding to a simulation, in said reference system, of a manoeuvre for exit from the parking spot starting from a predetermined end-of-parking position, when the vehicle has not yet started the parking manoeuvre and is still situated outside of the parking space, said signals that indicate said reference-system positions of the vehicle along the reference path representing values assumed by said parameters in said simulation, which are different from said impact values.

2. The parking-assistant system according to claim 1, wherein said logic envisages that said processing mechanism execute a querying operation wherein:

said parameters assume initial values, defined with respect to said reference system, that correspond to said end-of-parking position of the vehicle;

said parameters are then varied starting from said initial values in a way corresponding to the simulation of a first manoeuvre of advancement of the vehicle for exiting from the parking spot starting from said end-of-parking position;

it is verified whether, in said simulation, said parameters assume an impact value;

if said parameters do not assume any impact value, then said second parameters are varied in a way corresponding to a simulation of a second manoeuvre of advancement of the vehicle for exiting from the parking spot, subsequent to said first simulated manoeuvre;

if said parameters assume, instead, impact values, they are varied according to the simulation of a third manoeuvre of reverse and subsequently according to the simulation of a new first manoeuvre, until in the simulation of the new first manoeuvre said parameters assume only values different from said impact values, at that point said parameters being then varied in a way corresponding to the simulation of said second manoeuvre of advance;

said signals that indicate the reference positions, generated by said processing mechanism, representing the values of said parameters assumed in said first, new first, second, and third manoeuvres, which are different from said impact values.

3. The parking-assistant system according to claim 1, further including a control mechanism suitable for generating, during the parking manoeuvre, control signals as a function of the difference between the signals of said series and signals indicating the effective position of the vehicle during the parking manoeuvre.

4. The parking-assistant system according to claim 1, wherein said system further includes a unit designed to identify the effective position of the vehicle within said reference system, during the parking manoeuvre.

5. The parking-assistant system according to claim 1, wherein said end-of-parking position is identified in such a way that the vehicle is closer to a rear obstacle than to a front obstacle.

6. The parking-assistant system according to claim 2, wherein said impact values correspond to co-ordinates of said first and second obstacles in said reference system, varied with pre-set safety margins.

7. The parking-assistant system according to claim 2, wherein said first manoeuvre and said new first manoeuvre are simulated with a first steering angle corresponding to the maximum steering angle of the vehicle.

8. The parking-assistant system according to claim 2, wherein said second manoeuvre is simulated via polynomial curves, imposing that said curves be tangential to the direction of the vehicle at the end of said first manoeuvre or said new first manoeuvre, and to the direction of the vehicle in the start-of-manoeuvre position.

9. The parking-assistant system according to claim 1, wherein said parameters correspond to co-ordinates of the vehicle in the positions assumed during simulation of the exit manoeuvre.

10. The parking-assistant system according to claim 2, wherein the position of the vehicle at the end of said first manoeuvre or said new first manoeuvre is determined on the basis of pre-set distances with respect to said first obstacle and/or second obstacle.

11. The parking-assistant system according to one claim 1, wherein said parameters correspond to the co-ordinates of one or more of the four outermost corners of the vehicle in said reference system.

12. The parking-assistant system according to claim 1, wherein said system includes a Kalman filter, which, as a function of the difference between the signals of said series and signals indicating the effective position of the vehicle during the parking manoeuvre, generates signals of information to the driver to help him in directing the vehicle towards said reference path.

* * * * *